Nov. 5, 1963   B. D. MORGAN   3,109,218
EXPANDER ROLL COMBINATION FOR SMOOTHING WEB MATERIALS
Filed May 2, 1961

*INVENTOR.*
BURTON D. MORGAN
BY Oldham & Oldham
ATTYS.

United States Patent Office 3,109,218
Patented Nov. 5, 1963

3,109,218
EXPANDER ROLL COMBINATION FOR
SMOOTHING WEB MATERIALS
Burton D. Morgan, Hudson, Ohio, assignor to Morgan
Adhesives Company, Stow, Ohio, a corporation of Ohio
Filed May 2, 1961, Ser. No. 107,246
4 Claims. (Cl. 26—63)

This invention relates to expander rolls and combinations thereof for laterally stretching or spreading flexible web materials passing over the roll to remove wrinkles and the like therefrom. Typical web materials include paper, plastic film, and the like.

It is the general object of the invention to provide relatively simple, inexpensive, long-wearing expander rolls and combinations thereof for rapidly and efficiently removing wrinkles and the like from flexible web materials continuously passed over the roll.

The foregoing objects of the invention, and other objects which will become apparent as the description proceeds, are achieved by the provision, in combination, of a roll, a rubber sleeve on the roll, means fastening the center of the sleeve to the roll, web material continuously passing over an arcuate portion of the roll, and means for progressively stretching the rubber sleeve endwise of the roll over that portion engaged by the web to thereby smooth the web material laterally.

The invention likewise provides an expander roll including a cylindrical body having a groove near each end, a rubber-like sleeve snugly fitting over the cylindrical body, means fastening the sleeve to each end of the body and to the center thereof, and anti-friction means between the sleeve and body over the areas where the sleeve is not fastened to the body.

Figure 1:
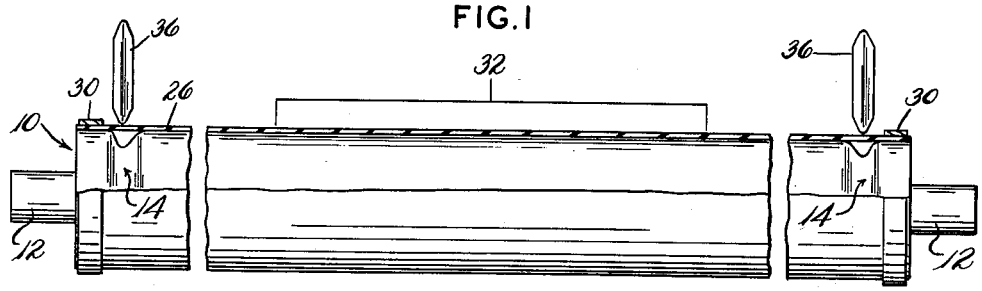
Figure 2:
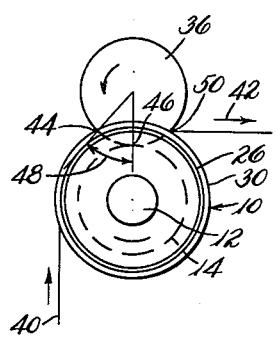
Figure 3:
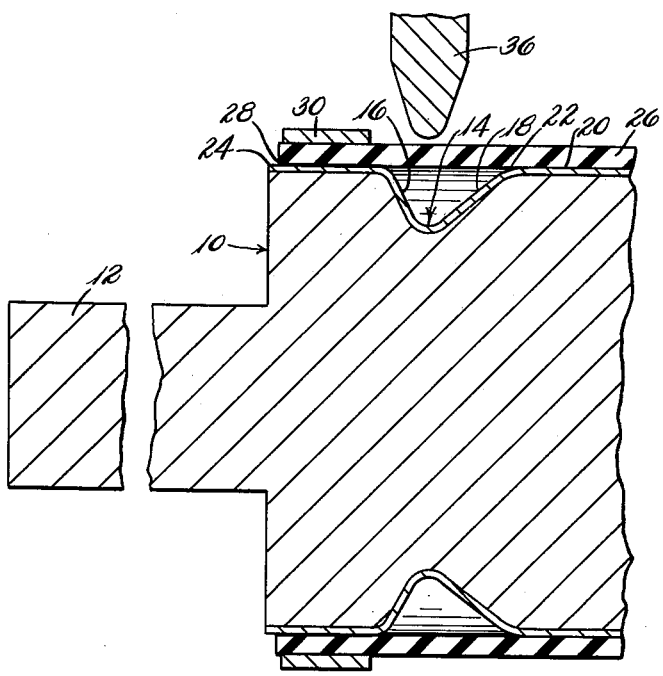

For a better understanding of the invention reference should be had to the accompanying drawings wherein
FIG. 1 is a front elevation, partially broken away, of an expander roll and combination incorporating the principles of the invention;
FIG. 2 is an end elevation of the apparatus of FIG. 1; and
FIG. 3 is an enlarged fragmentary longitudinal cross-sectional view of one end portion only of the apparatus of the invention.

In the drawings, the numeral 10 indicates generally an expander roll made of metal and having reduced diameter roll necks 12 and formed with a circumferential groove 14 near each roll end. The grooves 14 as best seen in FIG. 3 may have the side 16 of the groove nearest to the roll end somewhat more sharply inclined than the side 18 of the groove remote from the roll end, and with the inclined side 18 of the groove fairing into the roll surface 20 with a long flat radius 22. The entire roll surface is made as anti-friction as possible, for example by the provision of a layer 24 of chrome plating.

Fitting slidably and snugly over the roll 10 is a sleeve 26 of resilient rubber or rubber-like material with the ends of the sleeve being secured to the ends of the roll 10 in fluid-tight manner. In one typical installation the ends of the sleeve 26 are adhesively secured at 28 to the roll ends and a clamping metal band 30 is provided outside the end of the sleeve to further improve the seal and maintain it.

The center portion of the sleeve 26 is likewise secured to the roll 10, and in a typical installation wherein the roll 10 was 60 inches long, a 12-inch long area at the center of the sleeve 26 was secured to the roll 10, as by cementing, this being indicated by the numeral 32 in FIG. 1. Securing the sleeve 26 to the roll 10 in the center has been found to help insure the proper tracking of a flexible web material over the roll.

As best seen in FIGURES 1 and 2, a pair of disc-like rollers 36 are provided which are mounted on axes parallel to the axis of roller 10, and with these rolls so positioned, as shown in FIG. 2, as to force progressively the ends of the rubber sleeve 26 down into the grooves 14 to progressively stretch the rubber sleeve 26 endwise.

Having reference to FIG. 2, the roll 10 in a typical installation and turning in the direction of fabric feed receives continuous web material 40 which passes over, for example, a 90 degree arc of the roll 10, and with the material 40 being discharged in the direction shown by the arrow 42 after passage over the roll 10. The web material 40, which may be paper, plastic film, or the like, in a typical installation is 54 inches wide when operated upon by a roll 10 having a length of 60 inches. The disc-like rollers 36 are positioned in relation to the roll 10 so that from point 44 to point 46 and over an arcuate distance marked 48 the rubber sleeve 26 on the roll 10 is elongated from the thick center thereof to laterally stretch the web material and remove wrinkles and the like therefrom.

The web material 40 leaves the roll 10 after the maximum lateral stretch has been imparted thereto. More specifically, the web material 40 leaves the roll 10 at a point vertically above the point 46 of FIG. 2. The continued movement of the roll 10 and the disc roller 36 from point 46 to point 50 allows the rubber sleeve 26 to recover its original position because the web material 40 has already moved off of the roller 10 and being passed to other rolls or mechanisms which will maintain the web material flat, effect the lamination thereof, the printing thereof, or other desired use of operation thereof and/or thereon.

Returning to FIG. 3, it is the usual practice to put anti-friction means, usually in the form of a liquid between the roll 10 and the inside of the rubber sleeve 26 to reduce the friction between the inside of the sleeve and the outside of the roll to thereby facilitate the progressive and continuous stretching and relaxing of the rubber sleeve in the manner described. One typical anti-friction means is soapy water, with this at least partially filling the grooves 14 and extending down inside of the sleeve to the area 32 where the center of the sleeve is cemented to the roll.

While a certain representative embodiment and details have been shown for the purpose of illustrating the invention, it will be apparent to those skilled in this art that various changes and modifications may be made therein without departing from the spirit or scope of the invention.

What is claimed is:
1. In combination, a roll, rubber sleeve on the roll, means fastening the center and ends of the sleeve to the roll, the roll being formed with a groove near each end, disc-like roller means mounted on an axis parallel to the roll axis extending into each groove for progressively forcing the rubber sleeve into each groove to stretch a portion of the sleeve endwise, and liquid anti-friction means carried between the sleeve and the roll over the portions of the sleeve stretched.
2. In combination, a roll, a rubber sleeve on the roll, means fastening the center and ends of the sleeve to the roll, the roll being formed with a groove near each end, and disc-like roller means mounted on an axis parallel to the roll axis extending into each groove for progressively forcing the rubber sleeve into each groove to stretch a portion of the sleeve endwise.
3. An apparatus for spreading web materials comprising a roll, an elastic sleeve on the roll, means fastening the ends of the sleeve to the roll, an annular groove formed in the outer periphery of the roll adjacent each end thereof, and roller means extending into each groove for pro- gressively forcing the sleeve into each groove to stretch a portion of the sleeve endwise.

4. In combination in apparatus for spreading web materials, a roll, an elastic sleeve on the roll, means fastening the ends of the sleeve to the roll, the roll being formed with groove means near at least one end, and roller means extending into the groove means for progressively forcing the elastic sleeve into the groove means to stretch a portion of the sleeve endwise.

References Cited in the file of this patent

UNITED STATES PATENTS

| | | |
|---|---|---|
| 216,964 | Lanham | July 1, 1879 |
| 2,120,435 | Desbordes et al. | June 14, 1938 |
| 2,171,551 | Hannig | Sept. 5, 1939 |
| 2,220,760 | Gates et al. | Nov. 5, 1940 |
| 2,560,038 | Trainer | July 10, 1951 |
| 2,702,406 | Reed | Feb. 22, 1955 |
| 2,715,761 | Dougherty | Aug. 23, 1955 |
| 3,012,301 | Rogers et al. | Dec. 12, 1961 |

FOREIGN PATENTS

| | | |
|---|---|---|
| 1,064,839 | France | Dec. 30, 1953 |
| 328,045 | Great Britain | Apr. 24, 1930 |
| 486,925 | Great Britain | June 9, 1938 |